United States Patent [19]

Rowan

[11] Patent Number: 5,161,441
[45] Date of Patent: Nov. 10, 1992

[54] CIRCLE SHEARS

[76] Inventor: Gene R. Rowan, 3469 W. Benjamin Holt, Apt. #477, Stockton, Calif. 95209

[21] Appl. No.: 792,712

[22] Filed: Nov. 15, 1991

[51] Int. Cl.⁵ .............................................. B26D 1/24
[52] U.S. Cl. .......................................... 83/51; 82/57; 83/490; 83/679
[58] Field of Search ................... 83/490, 51, 495, 500, 83/885, 676; 82/57

[56] References Cited

U.S. PATENT DOCUMENTS

| | | | |
|---|---|---|---|
| 2,325 | 11/1841 | Bulkley et al. | 254/97 |
| 1,519,815 | 12/1924 | Vance | 83/490 |
| 1,545,029 | 7/1925 | Bechtold | 83/490 |
| 1,971,701 | 8/1934 | Bills | 83/490 X |
| 4,397,207 | 8/1983 | Isaac | 83/490 |

OTHER PUBLICATIONS

Roper Whitney Co. Catalog M, "Manually Operated Tools" p. 27 (Circle Shears No. 298) (1984).

*Primary Examiner*—Douglas D. Watts
*Assistant Examiner*—Kenneth E. Peterson
*Attorney, Agent, or Firm*—Jacques M. Dulin; Thomas C. Feix

[57] ABSTRACT

A circle shear device for cutting holes and rings in sheet metal wherein a pair of spaced apart, coaxially aligned center shafts are each provided with a cutter wheel which is mounted on a radially extended arm. In operation a metal blank is inserted between the two spaced apart center shafts and the center shafts are brought together wherein the sheet metal blank is restrained from moving by the bearing mounted supporting platform members of each center shaft. Synchronous rotation of the center shafts is achieved by a jack shaft assembly which joins the two center shafts. In a preferred embodiment, a motor is provided to power the rotation of the shafts. In an alternate embodiment, the shafts may be rotated by the use of a hand crank. A pneumatic cylinder is also provided to one of the shafts to permit vertical reciprocation of the shafts for removal and insertion of metal blanks for cutting operation. In one embodiment, the circle shears may be implemented in an automatic feed system wherein sheet metal is directed onto a line from a spooling apparatus. The metal sheet is then cut into even sections via a blanking apparatus, after which each blank is passed through the circle shear station for hole cutting operation. The cut blanks may be removed from the line or advanced to another station for additional metal forming.

17 Claims, 2 Drawing Sheets

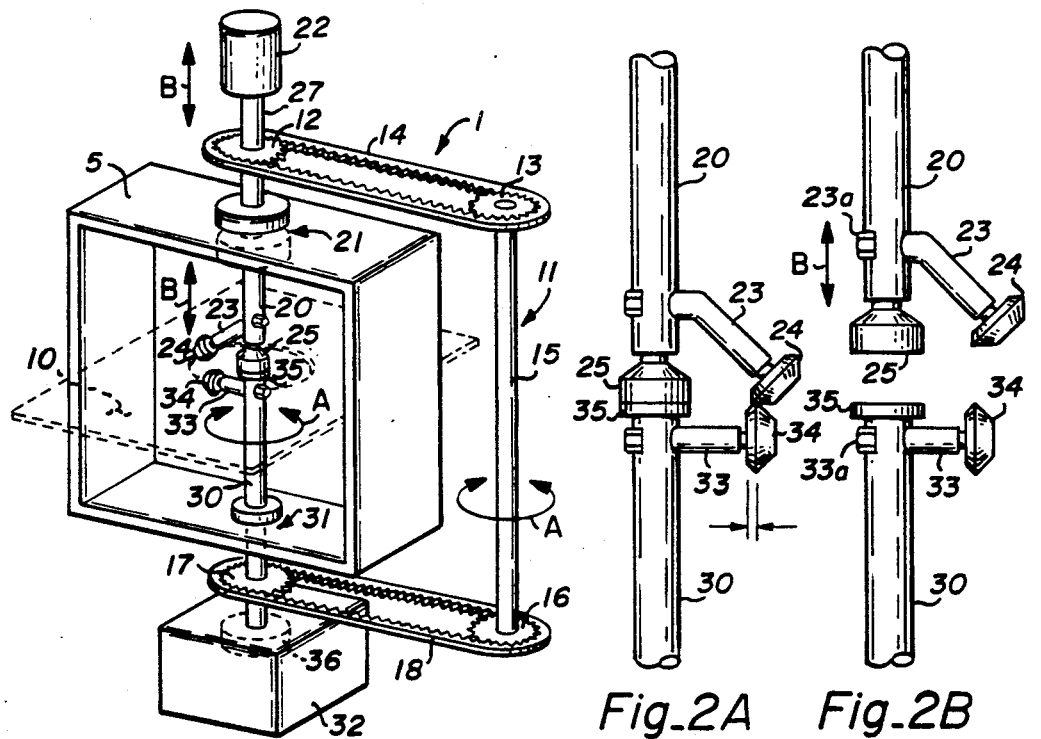
Fig_1  Fig_2A  Fig_2B
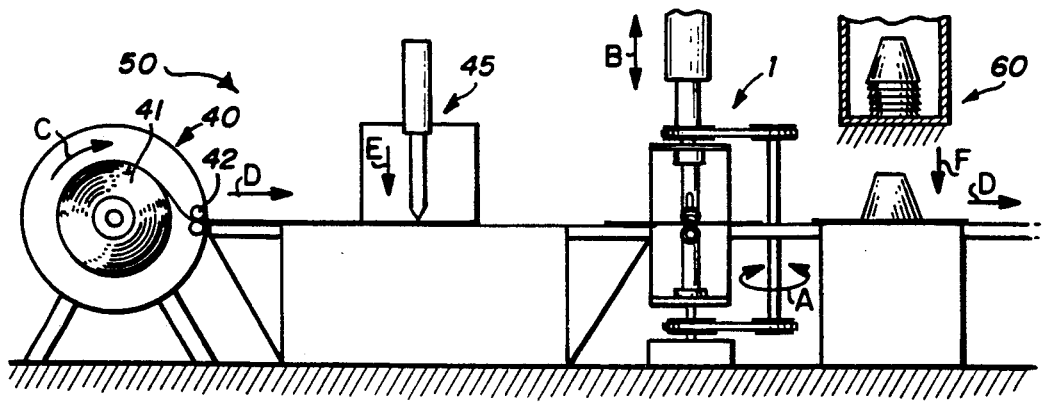
Fig_3

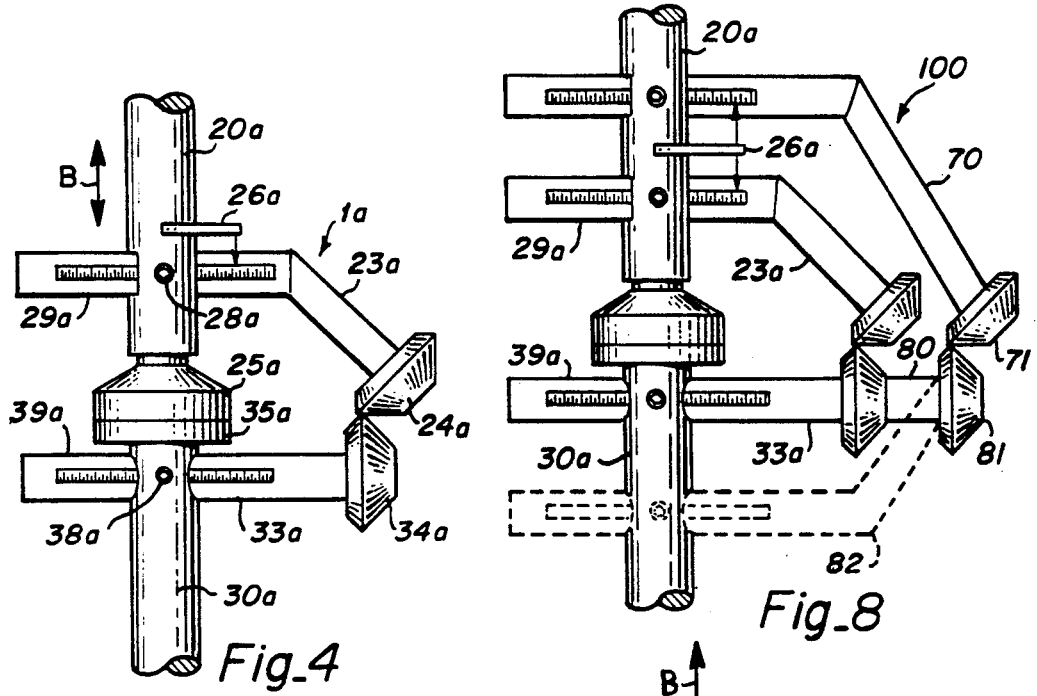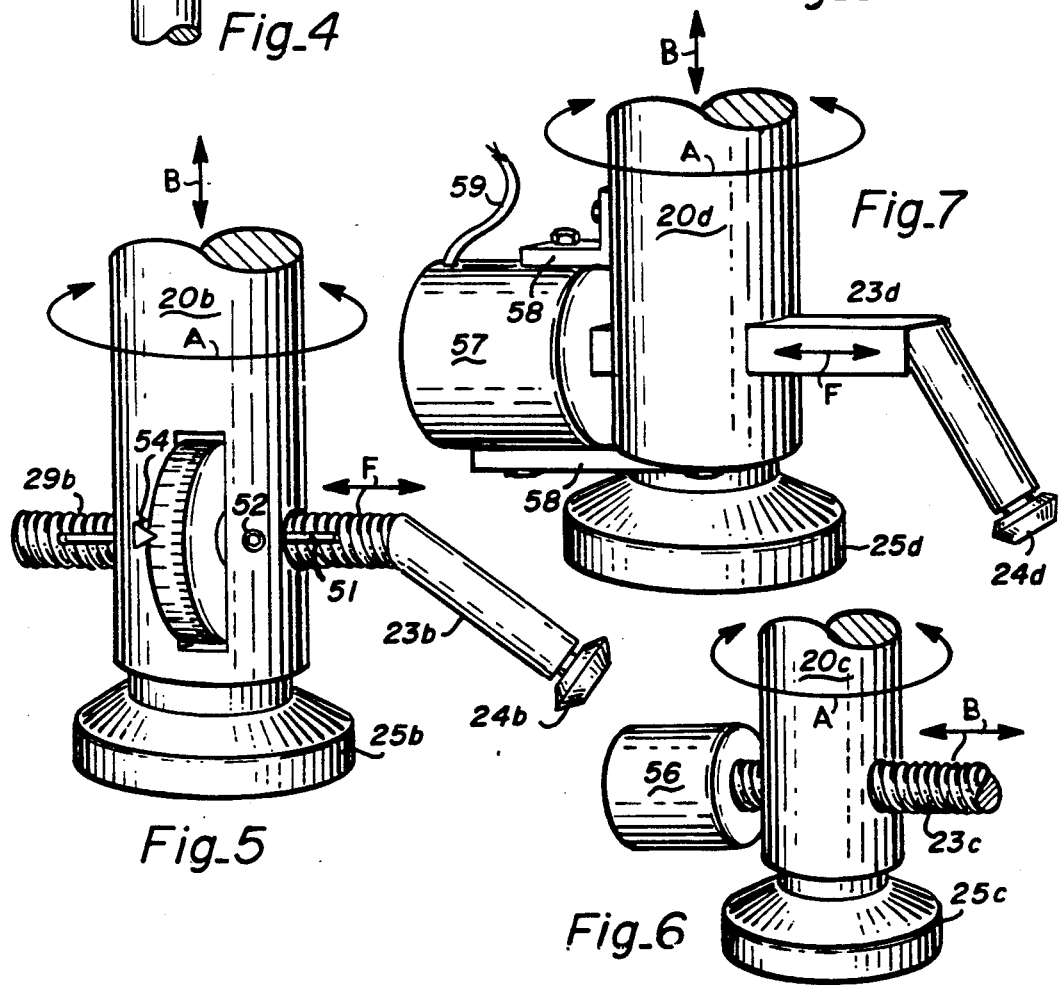

CIRCLE SHEARS

FIELD

The present invention relates generally to an apparatus and method for cutting circles and rings in sheet metal. More particularly, the invention relates to a sheet metal circle shear apparatus and method whereby a pair of cutting wheels are rotatably mounted on a pair of coaxially aligned, spaced apart center shafts, and whereby at least one of the center shafts is reciprocable to permit the insertion of a sheet of metal therebetween for cutting circular holes therein. The center shafts are linked together by a common jack shaft and are powered to rotate about their longitudinal axes to permit the cutting wheels to rotate along a circular path and cut a hole in the metal sheet.

BACKGROUND

Sheet metal is the preferred material of construction for the fabrication of ducts and other fittings used in heating and ventilation systems. For many of the fittings, a hole or ring must first be cut in a flat metal sheet prior to the fixation of a tubular or conical piping member thereover.

One method for cutting a hole in a sheet metal blank is by using a manually operated circle shear machine. An example of a typical manually operated circle shear machine is the model No. 298 offered by the Roper Whitney Co. of Rockford, Illinois. This machine includes two opposed cutter wheels which are clamped down on a top and bottom surface of the metal sheet. The cutter wheels are then power rotated to draw the metal sheet through the cutter wheels in a circular pattern to form a hole cut-out in a manner similar to a can opener spinning a can in which it is opening.

A principal disadvantage with this type of circle shear machine is that it cannot be feasibly implemented in existing automatic feed systems. Current state of the art automatic feed systems for sheet metal fabrication typically comprise a plurality of different in-line sheet metal working stations (e.g., a blanking machine, a forming machine, etc.), and are linked together by a belt or chain drive transport mechanism. The sheet metal is held stationary at each metal working station and then advanced to the next station via a conveyor. Implementation of the aforementioned circle shear machine would result in major complications in the handling of the metal sheet, since now the metal sheet must be rotated in the middle of the automated line in order to generate a hole cut-out by the circle shear machine. The handling difficulties would only be increased when a wider diameter circle cut is desired since this requires that the entire sheet metal section be moved through a wider circular path by the cutter wheels.

U.S. Pat. No. 4,397,207 (Isaao, 1983) teaches to provide a sheet metal cutting device which is mounted on a wheeled dolly. The device includes an adjustable trammel assembly which guides the dolly in an arc as a pair of powered cutting wheels work their way through the metal sheet. Isaac is directed towards cutting large radius curves and circles for forming conical upper portions of grain bins and like applications and is not well adapted for cutting smaller holes for use in heating and ventilation systems on a mass production scale. Also, it is not feasible to implement the cutting device of Isaao into existing automated sheet metal fabrication machines since the wheeled dolly must be permitted to move around the sheet metal to make a cut.

Another method for cutting holes in sheet metal sections is by using a circular die to punch a hole in the metal sheet. This method is particularly well suited for use in an automated line wherein a large run of sheet metal blanks having the same size hole is desired. However, this method becomes cost prohibitive for smaller production runs of sheet metal blanks and for production runs having different sized diameter holes, since a separate die is required for each different size diameter hole. Replacing dies is a labor intensive process which slows down productivity. Also, the use of dies in general means increased tooling costs. It is not uncommon for sheet metal fabricators to invest $20,000 to $40,000 for an adequate supply of dies. Moreover, as the dies are used, additional expense is incurred for periodic re-sharpening and replacement Accordingly, there is a definite need in the art for an improved circle shear machine which is simple to operate and is easily implemented in current automatic feed sheet metal fabrication systems. There is also a need for such a circle shear machine which includes means for simple adjustment of the cutting hole diameter and is economical to operate in terms of tooling costs.

The Invention

OBJECTS

It is a principal object of the invention to provide a circle shear machine having a cutting jaw formed by overlapping cutter wheels and whereby a first and second cutter wheel are separately mounted on a individual ones of a pair of coaxially aligned rotatable center shafts which, when operated under power, move the cutter wheels in a circular path to cut a hole or ring in a stationary metal sheet positioned within the cutting jaw formed by the cutter wheels;

It is another object of the invention to provide the circle shear machine wherein the cutter wheels are mounted on laterally extending arms which are removable from the rotatable center shafts to permit easy replacement of the cutter wheels/arms and adjustment of the cutting hole diameter;

It is another object of the invention to provide the circle shear machine having means for convenient and reliable adjustment of the hole cutting diameter without the need of removing the arms from the center shafts;

It is another object of the invention to provide a circle shear machine that is easily implemented into existing automatic feed sheet metal fabrication systems;

It is another object of the invention to provide a method for cutting a hole or ring in a metal sheet wherein a pair of cutting wheels are rotated in a circular motion about a stationary metal sheet positioned therebetween; and Still further objects will apparent from the following description, drawings and claims.

DRAWINGS

FIG. 1 is an isometric view of the present invention:

FIGS. 2A–2B are a series of enlarged fragmentary side elevation views illustrating the reciprocating motion of the upper center shaft as it moves between the operating and non-operating positions;

FIG. 3 is a side elevation view of an automated sheet metal fabrication line showing the implementation of the embodiment of FIG. 1 therein;

FIG. 4 is a schematic representation of a first alternate embodiment of the present invention illustrating the manually adjustable arms;

FIGS. 5-7 are enlarged fragmentary isometric views showing additional alternate embodiments for lateral arm adjustment; and FIG. 8 is a schematic representation of another alternate embodiment illustrating the use of a second pair of cutter wheels for forming ring cut-outs.

SUMMARY

A circle shear machine for cutting holes and rings in sheet metal whereby the sheet metal is held stationary by a pair of coaxially aligned and opposed center shafts which are each provided with a thrust bearing mounted support platform to engage top and bottom surfaces of the metal sheet at the locus center of the hole to be cut. The center shafts are also provided with laterally extending arms having freely rotatable cutter wheels mounted thereon whereby the cutter wheels are disposed to engage the upper and lower surfaces of the metal sheet at a common point along the circumference of the circle to be cut. In an operating position, the cutter wheels are disposed to overlappingly engage one another to form a cutting jaw.

To begin the cutting operation, the center shafts are simultaneously rotated about their longitudinal axes, thus driving the cutter wheels along the circumference of the circle to be cut until the circle cut is completed. Simultaneous rotation of the center shafts is accomplished by means of a linking assembly comprising a jack shaft and two gear and cog belt transfer assemblies, each associated with one of said upper and lower center shafts. In a preferred embodiment, the center shafts are rotatably mounted, preferably through the use of known journaled bearing assemblies, within upper and lower portions of a box-like frame work or housing.

A pneumatic air cylinder is also provided to the upper center shaft to permit vertical reciprocating movement so that metal sheet may be inserted or removed from the cutting jaw formed by the overlapping cutter wheels. The invention is readily implemented in current state of the art automatic feed systems for sheet metal fabrication, since a hole is cut in a stationary sheet metal blanks without the need for rotating the blanks past the cutter wheels as is typically the case with prior art circle shear machines. The present invention also offers advantages over circle dies or punch-type hole machines of reduced tooling costs and ease of changing hole diameter cutting sizes.

In a first alternate embodiment the arms include means for lateral extension to provide a measure of adjustability for changing the hole cutting diameter without the need for entirely replacing the arms or cutter wheels. Means for lateral arm extension is accomplished by adjustably sliding the horizontal shank portions of the arms through a receiving bore hole of its respective center shaft and securing the arm to that center shaft by means of a set screw or other like hardware securing means.

In further alternate embodiments for adjusting the lateral extension of the arms, it is proposed to cut threads along the horizontal shank portion of the arm and provide a thumb wheel disposed transverse in the center shaft to laterally advance or retract the threaded arm portion in response to an actuation of the thumb screw. A dial indicator and an additional set screw may be provided to further assist in the precise positional setting of the arm with respect to the center shaft. Other alternate embodiments for providing arm extension means include stepper motors, a ball-type linear actuator, a solenoid motor or an air cylinder motor.

Another alternate embodiment for the invention comprises an additional pair of arms having cutter wheels mounted thereon and whereby the second pair of arms are disposed to position the second pair of cutter wheels at a point outboard (greater circle diameter) of the first pair of cutter wheels so that a ring may be cut in the metal sheet during rotation of the center shafts.

In another embodiment, the circle shear apparatus is implemented in an automatic feed sheet metal fabrication system wherein a continuous strip of metal sheet is first pulled off a spooling apparatus where it is then fed onto an automated line. The sheet metal is then passed through a blanking machine which measures and cuts the sheet metal into uniform sections. Each sheet metal blank or section is then advanced to the next station whereby the circle shear apparatus of the present invention cuts a hole in the blank section after which the perforated sheet metal blank is advanced to another station for stacking, sorting or further forming.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

A circle shear machine constructed in accordance with one embodiment of the present invention is indicated generally by the reference numeral 1 in FIG. 1.

The circle shear machine 1 comprises a pair of center shafts, including an upper center shaft 20 and a lower center shaft 30, each having thrust bearing mounted sheet metal support members 25, and 35, respectively, which, when brought face together, engage on a top and bottom surface of a sheet metal blank 10 (shown in phantom), which is positioned therebetween. The upper center shaft 20 includes a top arm 23 which is secured at one end to the center shaft and includes a freely rotatable cutter wheel 24, mounted at its outer free end. Similarly, lower center shaft 30 includes a laterally extending arm 33 having one end fixed to the lower center shaft 30 and also includes a freely rotatable cutter wheel 34 mounted at its other free end.

The upper and lower center shafts 20, 30 are rotatably mounted within a frame work 5 by bearing assemblies 21 and 31, respectively. In the preferred embodiment, center shafts 20, 30 are power-driven by a motor (not shown) to rotate in the direction as shown by Arrow A while the support members 25 and 35 restrain the sheet metal blank 10 from moving. Synchronous movement of the upper and lower center shafts 20, 30 is achieved by use of a synchronizing drive assembly 11, well known in the prior art. In the present example, the drive assembly 11 comprises a jack shaft 15 which links together upper and lower toothed cog belts 14, 18 and gear assemblies 12, 13, 16, 17. The upper cog belt and gear assembly includes a first gear 12, disposed in fixed relationship with an outer sleeve portion 27 of upper shaft 20 and gear 13 connected to the upper end of jack shaft 15. Cog belt 14 transfers rotational motion between gears 12 and 13. Similarly, the lower cog belt and gear assembly includes gear 17, disposed integral with lower center shaft 30 and gear 16 connected to a lower portion of jack shaft 15. Cog belt 18 transfers rotational motion between gears 16 and 17.

The lower center shaft 30 is also mounted at its bottom end to a base support 32. An additional bearing member 36 may be used to rotatably anchor the lower center shaft 30 within the base support 32. The top end of the entire upper center shaft 20 also includes an air cylinder 22 which permits vertical reciprocating motion of the entire upper center shaft 20 as indicated by Arrow B.

In the preferred embodiment of the invention, it is desirable to provide a ¼" vertical displacement of the upper center shaft 20 so that conventionally sized ¼" thick metal sheet may be inserted between the cutter wheels 24 and 34 for loading and unloading. In the preferred embodiment, the upstanding walls of the housing/framework 5 are spaced apart by a distance of at least 24 inches to accommodate standard width sheet metal blanks commonly handled in automatic feed systems. As is evident from FIG. 1, the accomodating frame width spacing is exemplary of a simple means for restraining the migration or rotation of a standard width sheet metal blank during cutting operation, thus obviating the need for manual intervention by a sheet metal worker in holding the work piece when the metal blank is fed into the circle shear apparatus. However, it is understood that the framework 5 may be modified to accommodate larger sheets, including, but not limited to commercially available 4'×8' sheet metal blanks.

While the preferred embodiment discloses the upper center shaft as having the air cylinder means for vertical reciprocation, it is understood that an air cylinder could just as easily be used in combination with the lower center shaft to provide further vertical reciprocation displacement capability to the cutter wheels. It is also understood that a hand crank may be used instead of a motor to drive the simultaneous rotation of the center shafts.

FIGS. 2A and 2B illustrate in greater detail the vertically reciprocating movement of the upper center shaft 20 (indicated generally by reference Arrow B) with respect to the lower center shaft 30. FIG. 2A shows an "operating" position wherein upper support 25 of upper center shaft 20 engages a top surface of a sheet metal blank (omitted for clarity), and lower support 35 of lower center shaft 30 engages a bottom surface of the sheet metal blank. In this position, the cutting edges of top cutter wheel 24 and bottom cutter wheel 34 are brought together on both top and bottom sides of the sheet metal blank to begin cutting operation. As is best seen in FIG. 2B, the upper center shaft 20 has been reciprocated upward (albeit an exaggerated amount for purposes of illustration) to permit the removal or insertion of a sheet metal blank between upper support 25 and lower support 35.

In the preferred best mode, the cutting edges of the cutter wheels 24 and 25 overlap each other slightly to form a cutting jar. Also, each cutter wheel 24, 34 extends just beyond the blank bearing support surface of its corresponding support members 25 and 35.

It should be noted that at all times during operation the sheet metal blank 10 is held stationery while the cutting apparatus rotates about a circular path to cut a hole. This apparatus provides a simple approach for cutting holes in sheet metal and is easily implemented in current state of the art automatic feed systems which employ metal working stations that also require that the advancing sheet metal blanks be prevented from rotating during operation.

FIG. 3 illustrates the implementation of the circle shear machine 1 in an automatic feed system 50. In this example, the automatic feed system 50 comprises a spooling apparatus 40, a blanking apparatus 45, a circle shear machine 1 and a stacking apparatus 60. Spooling apparatus 40 includes a rotating mandrel 41 which directs sheet metal off a roll through rollers 42 onto an assembly line where the metal sheet is first measured and then cut into sections or "blanks" by the blanking apparatus 45 and then each blank is advanced in turn to the next station. In the present example, the next station is the circle shear machine 1 of the present invention. As the blanks are advanced along the line, they are secured by upper and lower support members 25 and 35 of the center shafts 20 and 30, so that the cutter wheels 24 and 34 engage the upper and lower surface of the "engaged" blank at a common point. The motor for the sheet metal machine 1 is then actuated, causing the center shafts to simultaneously rotate, so that cutter wheels 24 and 34 follow a circular path having a diameter which is determined by the lateral extension of arms 23 and 33. In this manner, a hole is formed in the metal sheet.

Upon completion of this operation, the upper center shaft 20 is raised via air cylinder 22, and the metal blank is advanced to the next station for further metal forming operation. In the present example, a sorter or loader machine 60 drops conical sections over the cut holes in the metal blanks for subsequent fixation by welding, gluing or other known bonding techniques for metal fabrication.

When a different sized diameter hole is needed, the arms 23 and 33 are simply removed from the center shaft 20 and 30 by loosening mounting hardware 23a and 33a, respectively. In this fashion, a different set of laterally extending arms 23 and 33 may be mounted onto center shafts 20 and 30 with relative ease. It should be noted that the cutting wheels of this invention offer a significant advantage of greater savings in labor and tooling costs over conventional circle punch die machines The individual cutter wheels cost on the order of $50 a piece as compared to the price of $2500.00–$3500.00 for a single die, and retain their cutting edge for an equal amount of time as a dedicated circle diameter die FIG. 4 illustrates a first alternate embodiment of a circle shear machine having means for adjusting the lateral distance of the arms. In this embodiment, the circle shear machine la includes, as before, upper and lower center shafts 20a, 30a, having laterally adjustable arms 23a and 33a. Arms 23a, 33a include measuring indicia along their horizontal shank portions 29a, 39a to permit the user/operator to keep a visual record of the lateral distance that the arms 23a, 33a have been extended. Upper center shaft 20a also includes a dial indicator 26a which assists the operator in accurately setting the desired circle hole cutting diameter. The arms 23a and 33a may be slidably secured in the circle shaft by any number of known means for doing so. In the present example, the shank portions 29a, 39a of arms 23a, 33a are received in transverse bore holes in vertical center shafts 20a, 30a and are held secure by allen bolts 28a, 38a.

FIGS. 5-7 show further alternate embodiments for adjusting the lateral distance of the arms with respect to the center shafts. For purposes of brevity only the lateral arm adjustment means for the upper center shafts are discussed in detail.

As best seen in FIG. 5, a set screw and thumb wheel is used to laterally adjust the arm 23b and cutter wheel 24b. The horizontal shank portion 29b of arm 23b is formed as a threaded shaft having a transverse slot 51 which cooperates with set screw 52 for holding the arm 23b fixed with respect to upper center shaft 20b. The upper center shaft 20b is also provided with a thumb wheel 53 using an arrow indicator 54 for accurately determining the distance that the arm 23b has been moved in the lateral direction (i.e., the direction of Arrow F of FIG. 5).

FIG. 6 discloses the use of a stepper motor or a recirculating ball/linear actuator for laterally moving the arm 23c with respect to upper center shaft 20c. FIG. 7 shows the use of a solenoid 57 for laterally extending or retracting the arm 23d with respect to upper center shaft 20d. The solenoid 57 may be secured to the upper center shaft 20d by means of brackets 58 and may be linked to the existing motor or power supply of the automatic feed system via line 59. An air cylinder may also be used in place of the solenoid 57.

FIG. 8 discloses yet another alternate embodiment for the present invention wherein a second set of cutter wheels 71, 81 are provided to permit the circle shear apparatus to cut rings in sheet metal blanks positioned between the two pairs of cutter wheels. For ease of description, the embodiments shown in FIGS. 4 and 8 are identical, except for the addition of second upper arm 70 and cutter wheel 71 and the extension member 80 and cutter wheel 81. It should be noted that additional lower arms may also be included and arranged similarly to, but in mirrored fashion of the upper arm members 23a and 70. For example, lower arm 82 (shown in phanton) may be provided to lower shaft 30a and function in the same way as upper arm 70.

It should be understood that various modifications within the scope of this invention can be made by one of ordinary skill in the art without departing from the spirit thereof. I therefore wish my invention to be defined by the scope of the appended claims in view of the specification as broadly as the prior art will permit.

I claim:

1. A circle shear device for cutting holes in sheet metal comprising in operative combination:
    a) a generally open box-type framework having a pair of opposed upstanding side panels spaced apart a sufficient distance to permit the passage of sheet metal blanks therethrough;
    b) a pair of spaced apart, coaxially aligned center shafts including a first upper center shaft having an upper shaft portion rotatably mounted within a top portion of said framework and a second lower center shaft having a lower shaft portion rotatably mounted within a bottom portion of said framework, and wherein:
        i) said first upper center shaft includes a laterally extending first upper arm removably mounted adjacent a bottom end portion of said upper center shaft, said first upper arm including a distal end having a first cutter wheel disposed rotatably mounted thereon;
        ii) said second lower center shaft includes a laterally extending first lower arm removably mounted adjacent a top end portion of said lower center shaft, said first lower arm including a distal end having a first cutter wheel disposed rotatably mounted thereon;
        iii) said cutter wheels of said upper and lower center shafts having cutting edges disposed to overlappingly engage one another to form a cutting jaw;
    c) means for vertical reciprocation of at least one of said center shafts between a first rest position and a second operating position; and
    d) means for synchronous rotation of said center shafts so that said upper and lower arms and their cutting wheels are moved through a circular path to cut a hole in a provided metal sheet placed therebetween when said upper center shaft is in said second operating position.

2. A circle shear device for cutting holes in sheet metal as in claim 1 wherein:
    a) said upper center shaft includes a first platform member disposed rotatably connected adjacent a lower end of said upper center shaft for supporting a top surface of said provided metal sheet;
    b) said lower center shaft includes a second platform member disposed rotatably connected adjacent an upper end of said lower center shaft for supporting a bottom surface of said provided metal sheet; and
    c) said upper and lower support platform members engaging top and bottom surfaces of said provided metal sheet to prevent metal sheet movement when said cutter wheels are brought into shearing contact with said provided metal sheet.

3. A circle shear device for cutting holes in sheet metal as in claim 2 wherein said means for synchronous movement of said center shafts includes:
    a) a motion linking mechanism including a plurality of gear cogs, cog belts and a jack shaft; and
    b) said motion linking mechanism includes a hand crank to power the rotation of said center shafts.

4. A circle shear device for cutting holes in sheet metal as in claim 3 including means for adjusting the lateral extension of said first upper and lower arms.

5. A circle shear device for cutting holes in sheet metal as in claim 2 wherein said means for synchronous movement of said center shafts includes:
    a) a motion linking mechanism including a plurality of gear cogs, cog belts and a jack shaft; and
    b) said motion linking mechanism includes a motor for powered rotation of said center shafts.

6. A circle shear device for cutting holes in sheet metal as in claim 5 wherein said upper center shaft is vertically reciprocated between a first upward rest position and a second lowered operating position wherein:
    a) said first upward position raises said first upper cutter wheel a sufficient distance to permit the unobstructed exchange of additional provided metal sheet through said cutting jaw; and
    b) said vertical reciprocation means includes an pneumatic air cylinder.

7. A circle shear device for cutting holes in sheet metal as in claim 6 including means for adjusting the lateral extension of said first upper and lower arms.

8. A circle shear device for cutting holes in sheet metal as in claim 7 wherein said open box-like framework is formed as part of the support structure of an automatic feed system.

9. A circle shear device for cutting rings in sheet metal comprising in operative combination:

a) a generally open box-type framework having a pair of opposed upstanding side panels spaced apart a sufficient distance to permit the passage of metal sheet therethrough;

b) a pair of spaced apart, coaxially aligned center shafts including a first upper center shaft having an upper shaft portion rotatably mounted within a top portion of said framework and a second lower center shaft having a lower shaft portion rotatably mounted within a bottom portion of said framework, and wherein:

i) said first upper center shaft includes a pair of laterally extending upper arms removably mounted adjacent a bottom end portion of said upper center shaft, each of said upper arms including a distal end having a cutter wheel disposed rotatably mounted thereon;

ii) said second lower center shaft includes at least one laterally extending lower arm removably mounted adjacent a top end portion of said lower center shaft, said lower arm including a distal end having a pair of cutter wheels connected in series disposed rotatably mounted thereon;

iii) said pair of cutter wheels of said upper and lower center shafts having cutting edges wherein said cutter wheel of said first upper arm is disposed to overlappingly engage a first inboard cutter wheel of said lower arm to for a first inboard cutting jaw and said second cutter wheel of said second upper arm is disposed to overlappingly engage said second cutter wheel of said lower arm to form a second outboard cutting jaw;

c) means for vertical reciprocation of at least one of said center shafts between a first rest position to a second operating position; and d) means for synchronous rotation of said center shafts so that said upper and lower arms and their respective pairs of cutter wheels are moved through a circular path to cut a ring in a provided metal sheet placed therebetween when said at least one center shaft is in said second operating position.

10. A circle shear device for cutting holes in sheet metal as in claim 9 wherein:

a) said upper center shaft includes a first platform member disposed rotatably connected adjacent a lower end of said upper center shaft for supporting a top surface of said provided metal sheet;

b) said lower center shaft includes a second platform member disposed rotatably connected adjacent an upper end of said lower center shaft for supporting a bottom surface of said provided metal sheet; and c) said upper and lower support platform members engaging top and bottom surfaces of said provided metal sheet to prevent metal sheet movement when said cutter wheels are brought into shearing contact with said provided metal sheet.

11. A circle shear device for cutting holes in sheet metal as in claim 10 wherein said means for synchronous movement of said center shafts includes:

a) a motion linking mechanism including a plurality of gear cogs, cog belts and a jack shaft; and b) said motion linking mechanism includes a hand crank to power the rotation of said center shafts.

12. A circle shear device for cutting holes in sheet metal as in claim 11 including means for adjusting the lateral extension of said first upper and lower arms.

13. A circle shear device for cutting holes in sheet metal as in claim 10 wherein said means for synchronous movement of said center shafts includes:

a) a motion linking mechanism including a plurality of gear cogs, cog belts and a jack shaft; and b) said motion linking mechanism includes a motor for powered rotation of said center shafts.

14. A circle shear device for cutting holes in sheet metal as in claim 13 wherein said upper center shaft is vertically reciprocated between a first upward rest position and a second lowered operating position wherein:

a) said first upward position raises said first upper cutter wheel a sufficient distance to permit the unobstructed exchange of additional provided metal sheet through said cutting jaw; and b) said vertical reciprocation means includes an pneumatic air cylinder.

15. A circle shear device for cutting holes in sheet metal as in claim 14 including means for adjusting the lateral extension of said first upper and lower arms.

16. A circle shear device for cutting holes in sheet metal as in claim 15 wherein said open box-like framework is formed as part of the support structure of an automatic feed system.

17. A method for cutting holes and rings in sheet metal comprising the steps in operative sequence of:

a) securing a provided metal sheet on both top and bottom surfaces between opposed end portions of a pair of coaxially aligned shafts at a locus center of a hole to be cut, each of said shaft member end portions having a journal bearing platform support member mounted thereto for engaging said provided metal sheet;

b) aligning a pair of freely rotatable cutter wheels which are mounted on arms laterally extended from said shafts on top and bottom surfaces of said provided metal sheet along a circumference of said circular hole to be cut;

c) simultaneously rotating said shafts to drive said cutter wheels around the circular circumference to complete the hole cut; and d) reciprocating one of said shafts with respect to the other to facilitate removal of said metal sheet and permitting insertion of another metal sheet.

* * * * *